United States Patent [19]

Marshall

[11] Patent Number: 5,289,065
[45] Date of Patent: Feb. 22, 1994

[54] ZERO AIR GAP ORBITING GEAR STEPPER MOTOR

[75] Inventor: James E. Marshall, Southfield, Mich.

[73] Assignee: Ford Motor Company, Dearborn, Mich.

[21] Appl. No.: 43,048

[22] Filed: Apr. 5, 1993

[51] Int. Cl.⁵ .................................. H02K 37/00
[52] U.S. Cl. .............................. 310/49 R; 310/106
[58] Field of Search ................. 310/49 R, 49 A, 82,
310/83, 99, 106, 166, 254, 256, 257, 263;
318/85, 102, 701, 704

[56] References Cited

U.S. PATENT DOCUMENTS

| Re. 27,446 | 7/1972 | Welch | 310/49 |
|---|---|---|---|
| 2,857,536 | 10/1958 | Light | 310/49 |
| 3,147,425 | 10/1961 | Christoff | 310/82 |
| 3,561,006 | 2/1971 | Humphreys | 310/82 |
| 4,358,694 | 11/1982 | Grundland | 310/49 |
| 4,780,636 | 10/1988 | Gandhi et al. | 310/254 |

FOREIGN PATENT DOCUMENTS 2206660 of 0000 Fed. Rep. of Germany ........ 310/49

Primary Examiner—Steven L. Stephan
Assistant Examiner—Matthew Nguyen
Attorney, Agent, or Firm—Roger L. May; Mark L. Mollon

[57] ABSTRACT

A stepper motor having an internally toothed ring gear acting as a stator which is contacted by one or more pinion gears supported by a carrier. The ring gear stator is made up of several sets of teeth which are separately magnetically polarized to move the pinion gears about the ring gear. Three toroidal coils are preferably provided to charge three different sets of teeth which are arranged in a repeating series of three about the ring gear. Alternatively, a linear actuator can be provided to provide a linear output. The teeth may also include an individual coil wherein sets of teeth can be electromagnetically biased into a north or south polarity or remain neutral.

8 Claims, 3 Drawing Sheets

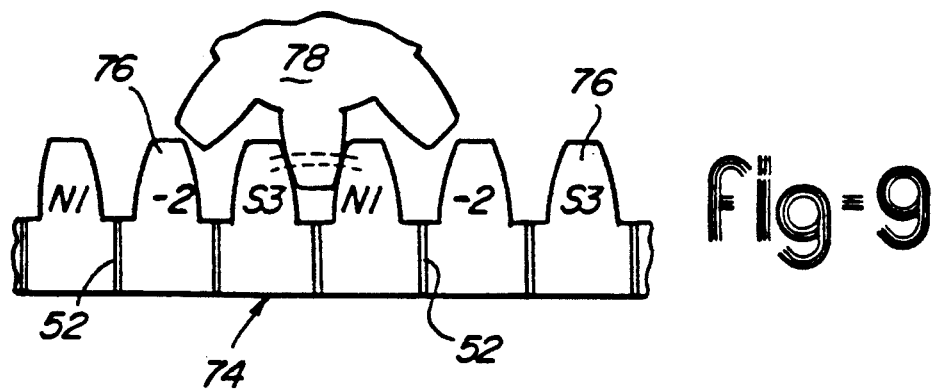
fig-9
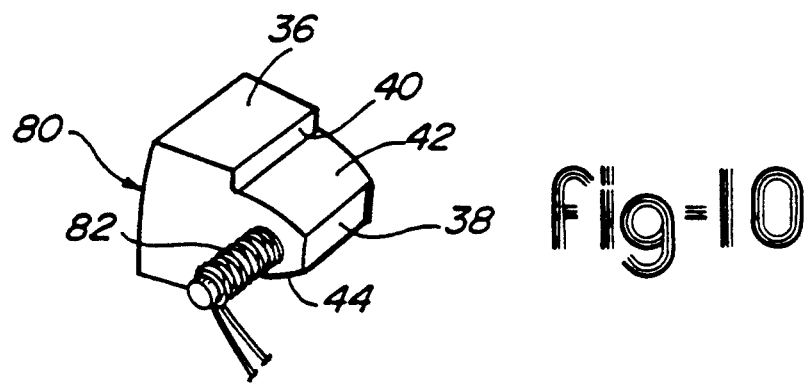
fig-10
fig-11
|  | 1 | 2 | 3 |
|---|---|---|---|
| I | N | S | - |
| II | N | S | N |
| III | - | S | N |
| IV | S | S | N |
| V | S | - | N |
| VI | S | N | N |
| VII | S | N | - |
| VIII | S | N | S |
| IX | - | N | S |
| X | N | N | S |
| XI | N | - | S |
| XII | N | S | S |

ZERO AIR GAP ORBITING GEAR STEPPER MOTOR

TECHNICAL FIELD

The present invention relates to stepper motors and more particularly to orbiting gear stepper motors.

BACKGROUND OF INVENTION

Stepper motors, or rotary transducers, are used in a wide variety of products where it is important to control the rate of rotation and rotational position of a shaft or other device.

An example of a prior art stepper motor or selectively positionable rotary transducer is disclosed in U.S. Pat. No. 4,358,694 to Grundland. The stepper motor disclosed in Grundland discloses a ring gear including at least one permanent magnet and a rotor which is rotationally moveable relative to the ring. An odd number of poles are provided on the rotor for selectively providing magnetic force to cause relative rotation therebetween. The magnet has a precisely machined inner wear surface which is rotated against the outer surface of the fixed stator. Teflon or oil may be used to reduce friction between the magnet and the stator but are not intended to interfere with the existence of an air gap between the stator and the rotor.

Other approaches to manufacturing stepper motors include the use of permanent magnets or rare earth materials. Such materials add cost to stepper motor construction.

Prior art stepper motors tend to be fairly large in size and limited in power output.

Any air gap between the opposite poles in the magnetic circuit results in a reduction of holding torque of the motor. The attractive forces between opposing poles is significantly reduced as a result of the existence of an air gap in the magnetic circuit.

These and other disadvantages encountered by the prior art are addressed by the present invention as summarized below.

SUMMARY OF INVENTION

It is an object of the invention to provide a stepper motor having zero air gap between pole pieces of a stator and a rotor which is moved by changing the polar states of sets of gear teeth forming the stator.

It is another object of the invention to provide a stepper motor having zero air gap which maximizes holding torque of the stepper motor.

It is another object of the invention to provide a low-cost stepper motor offering superior performance.

The above objects are achieved by providing a stepper motor in which a rotor directly contacts a stator gear having a plurality of teeth forming sets of pole pieces arrayed in an alternating pattern. Means are provided for inducing magnetic flux independently in each set of pole pieces. Means are also provided for minimizing flux leakage between adjacent teeth of the stator gear. The rotor includes at least one pinion gear having gear teeth which engage the teeth of the stator gear. The stepper motor also includes a control means for controlling the supply of opposed electromagnetic charges to separate and distinct sets of pole pieces forming teeth of the stator gear. The control means sequentially alternates the polarity of electromagnetic charges supplied to pole pieces in a desired direction to cause the rotor to move in that direction.

According to another aspect of the invention, a ring gear having internal tooth array forms the stator. The stator ring gear is comprised of a plurality of teeth arrayed in several sets to form the stator gear ring. The teeth of the stator ring gear are arrayed in an alternating pattern. Three coils are associated with the three sets of teeth forming the ring gear so that the control means can sequence the three sets of teeth forming the ring gear by providing electromagnetic charges to each of the coils independently.

In one preferred embodiment of the invention, the rotor includes three gears which contact the stator ring gear at equidistantly spaced points to contact corresponding gear teeth of the same set and having the same polarity. The three pinion gears are connected to a carrier which rotates an output shaft.

According to the invention it would be possible to provide a stepper motor for control valves and feedback control systems, such as automotive cruise-control systems. Another potential use for stepper motors of the present invention would be for instrumentation systems, such as speedometers, tachometers, and remote radio tuners in which digital input may be converted directly into an output in the form of analog display gauges. Use of the stepper motor of the present invention as an odometer provides the advantage of eliminating the need for a gear drive to connect the transmission with the speedometer and odometer.

Stepper motors made in accordance with the present invention are relatively small in size in comparison with the torque available due to the elimination of the air gap.

BRIEF DESCRIPTION OF THE DRAWINGS

FIG. 9 is a fragmentary side elevational view of a linear actuator rack and pinion gear set made in accordance with the present invention;

FIG. 10 is a perspective view showing a stator gear tooth for a motor made according to a different embodiment of the present invention;

FIG. 11 is a chart showing potential states for a ring gear stator having three sets or poles which are independently polarized.

BEST MODE FOR CARRYING OUT THE INVENTION

Figure 1:
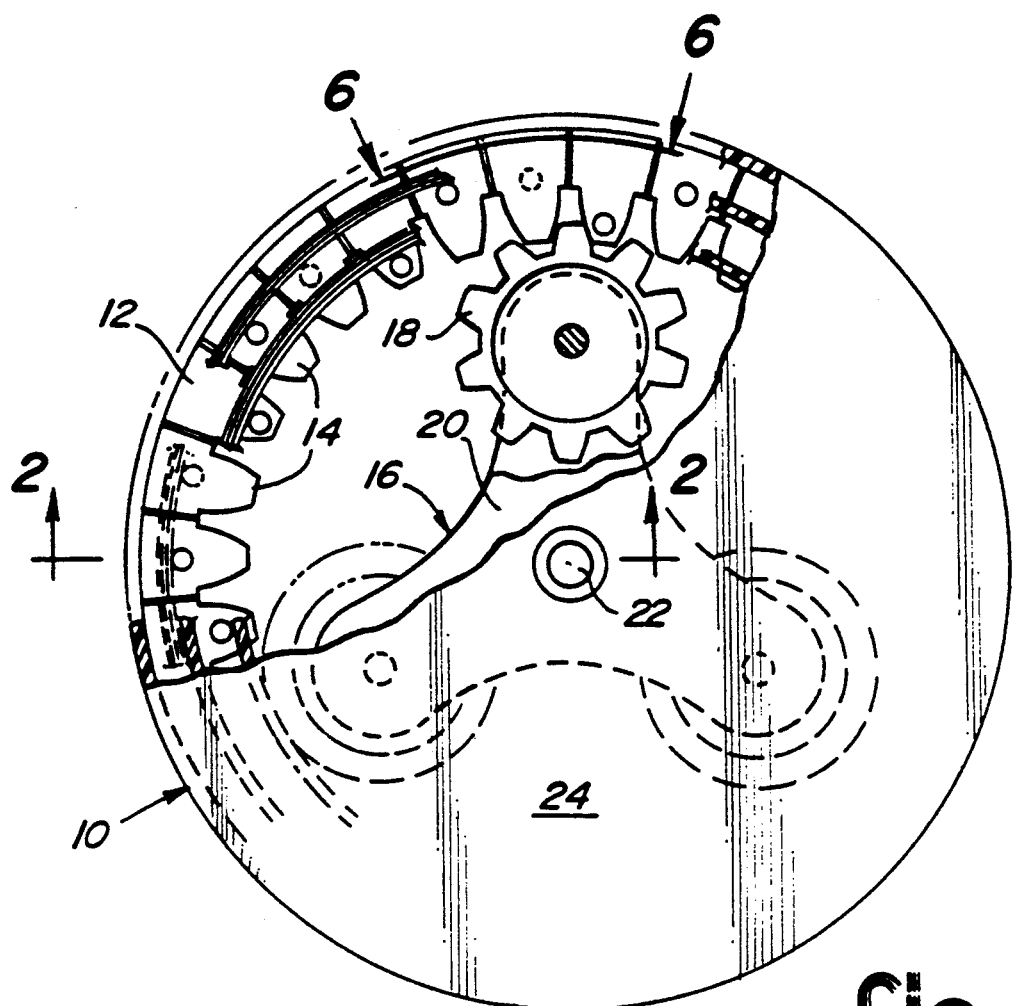
FIG. 1 is a partially fragmented plan view of a stepper motor made in accordance with the present invention.

Referring now to FIG. 1, a stepper motor 10 and ring gear 12 forming the stator of the stepper motor 10 are shown. The ring gear 12 has a plurality of teeth 14 which are arranged in two or more sets, preferably three sets. Each set of teeth 14 is subjected to the same induced magnetic fields at any one time. A rotor 16 is provided to move relative to the ring gear 12. Rotor 16 includes one or more pinion gears 18 and preferably three pinion gears as shown in FIG. 1. Pinion gears 18 are retained by a carrier 20. The pinion gears 18 and carrier 20 rotate as a unit relative to the ring gear 12. As the pinion gears 18 and carrier 20 rotate, a rotational output is produced at shaft 22. Stepper motor 10 is preferably enclosed within a housing 24.

Figure 2:
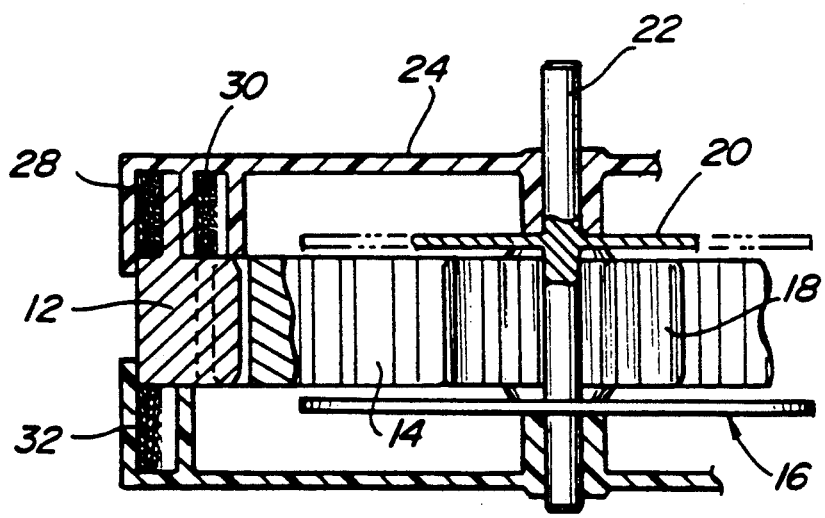
FIG. 2 is a cross-sectional view taken along the line 2—2 in FIG. 1.
Figure 6:
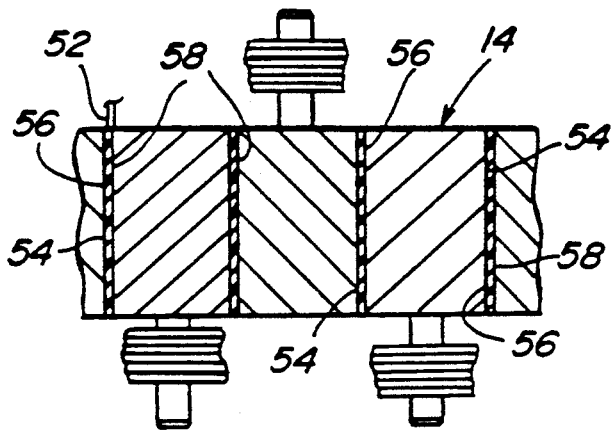
FIG. 6 is a cross-sectional view taken along the line 6—6 in FIG. 1.

Referring now to FIGS. 1, 2 and 6, the structure of the stepper motor 10 are explained in greater detail. First coil 28, second coil 30 and third coil 32 are torodial coils provided adjacent an axial side of the ring gear 12. First, second and third coils, 28, 30, 32 are each separately associated with three separate sets of teeth of the ring gear 12.

Figure 3:
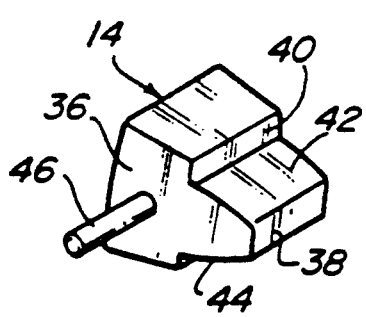
FIG. 3 is a perspective view of a tooth which forms a pole piece and part of a stator gear according to the present invention.
Figure 4:
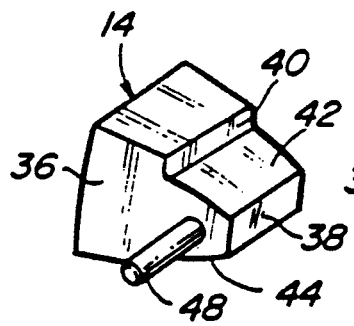
FIG. 4 is a perspective view of a tooth which forms a pole piece and part of a stator gear according to the present invention.
Figure 5:
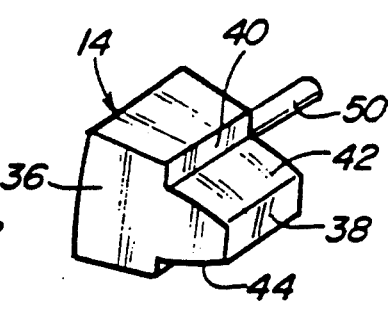
FIG. 5 is a perspective view of a tooth which forms a pole piece and part of a stator gear according to the present invention.

Referring now to FIGS. 3, 4 and 5, the teeth 14 are shown in greater detail. Each of the teeth includes a base 36 which is adapted to be placed adjacent the base 36 of an adjacent tooth 14. Each tooth includes a top land 38, a bottom land 40 and first and second sides 42 and 44. In FIG. 3, a first pin 46 is shown which is adapted to contact first coil 28 for electromagnetic induction. Second pin 48 is shown in FIG. 4, and is adapted to contact second coil 30. Third pin 50 is shown in FIG. 5, and is adapted to contact third coil 32 for electromagnetic induction.

Referring now to FIG. 6, an air gap 52 is provided between adjacent teeth 14. The air gap 52 between adjacent teeth 14 may be maintained by means of an insulative spacer 54 between the teeth. Spacer 54 is contacted on opposite sides by side wall 56 of one of the teeth 14 and side wall 58 of another of the teeth 14. Air gap 52 functions to minimize flux leakage between adjacent teeth 14. Also shown in FIG. 6 are connections between first, second and third coils, 28, 30 and 32 and the first, second and third pins 46, 48 and 50.

Figure 7:
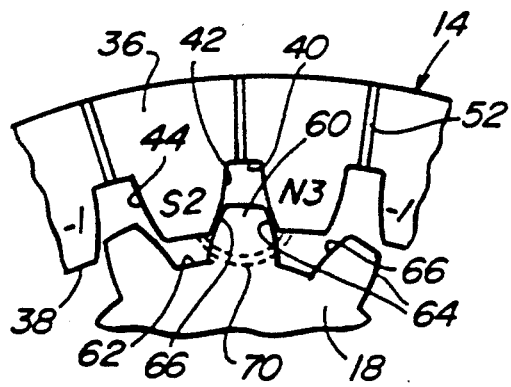
FIG. 7 is a fragmentary plan view showing a stator gear and a pinion gear in accordance with the present invention.
Figure 8:
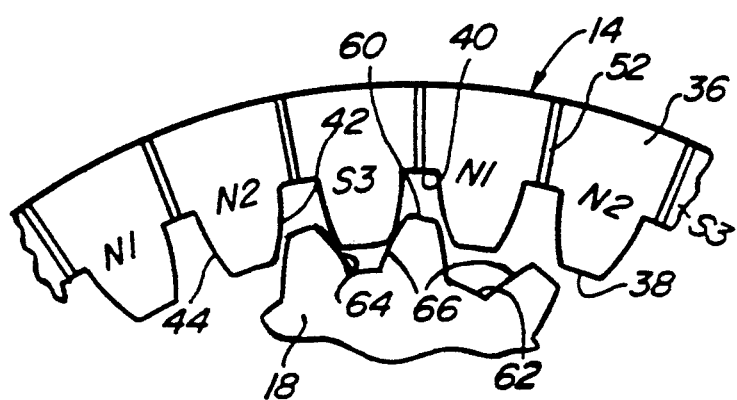
FIG. 8 is a fragmentary plan view showing a portion of a stator ring and pinion gear made in accordance with the present invention.

Referring now to FIGS. 7 and 8, the manner in which the pinion gears 18 contact the teeth 14 is shown in greater detail. Pinion gears 18 are of conventional design and include top lands 60, bottom lands 62 and first and second sides 66 and 64. As shown in FIG. 7, pinion gear 18 is shown in a position of equilibrium wherein the first side 66 of pinion gear 18 engages first side 42 of one of the teeth 14, while second side 64 of the pinion gear 18 contacts a second side 44 of another of the teeth 14. As illustrated in FIGS. 6 and 7, the teeth are polarized, with a pattern of the first coil 28 being neutral, second coil 32 having a south polar charge, and third coil 30 having a north polar charge. By changing the magnetic orientation of the coils, the pinion gear 18 may be caused to shift a half-step to the position shown in FIG. 8, wherein the first coil 28 has a north polar orientation, the second coil 32 has a north polar orientation and the third coil 30 has a south polar orientation. In this case, the pinion gear 18 will seek equilibrium wherein the pinion gear is centered over the tooth associated with the third coil having a south polar orientation. The pinion gear 18 assumes equilibrium over the tooth having a south polar orientation.

The teeth and rotor are preferably formed of low reluctance, ferromagnetic, non-permanent magnetic material. For example, high nickel steel alloy or an amorphous silicone material may be used in the manufacture of the teeth of the stator or rotor. It is important to minimize the residual magnetism so that the stepper motor is quickly responsive. As stated above, one of the advantages of the invention is that there is no need for any permanent magnetic material or use of rare earth material in the stepper motor.

As shown in FIG. 1, a most preferred embodiment providing a carrier 20 with three pinion gears 18. Preferably three sets of teeth 14 would be provided by the ring gear 12, and in one example, 30 teeth may be provided in three sets of ten teeth. By utilizing a multiple of teeth corresponding to the number of coils, the pinion gears 18 will contact corresponding teeth of the same sets simultaneously. By utilizing three pinion gears 18, a stable moving mechanism is provided in the stepper motor.

Referring now to FIG. 9, a linear actuator 74 is provided which is made up of a series of teeth 76. The teeth are divided into three sets of teeth, which are separately polarized to move a pinion gear 78. The linear actuator 74 operates in the same manner as the stepper motor 10 in other respects generally, but creates a linear output instead of a strictly rotational output.

Referring now to FIG. 10, an alternative embodiment of the teeth 80 for use in the stepper motor 10 or linear actuator 74 is shown, wherein a separate coil 82 is provided for each of the teeth 80. In this way, a series of teeth 80 may be provided and connected to a source of electromagnetic force which would permit sets of coils 82 to be energized simultaneously.

Referring now to FIG. 11, a chart is shown wherein a three-coil embodiment of the invention having three pinion gears on a carrier is operated. In one example, a gear stator having thirty teeth may have sixty step positions, incremented in six degree steps, by utilizing 12 properly sequenced states as shown in FIG. 11. As shown in FIG. 11, the first, second and third coils are in one of three conditions, north (denoted by "N"), south (denoted by "S") or neutral (denoted by a dash "-"). When all coils are excited, the rotor will assume a position centered over one of the teeth. When two coils are excited, the rotor will assume a position with a tooth of the rotor lodged between a north and south pole. This provides an equilibrium one-half tooth pitch from the previous condition.

To provide a useful rotary output, the rotor is preferably a planetary gear set with ratios selected for desired output angle per step. For example, a ring gear having thirty teeth would have a pitch diameter of 1.875 inches. The rotor may be a pinion gear having twelve teeth with a pitch diameter of 0.075 inches. This would provide a pitch of sixteen. An output drive sun gear having twenty teeth can be provided in conjunction with a pinion gear having fourteen teeth or a pitch diameter of 0.4375. With a sun gear having twenty teeth, and a pitch diameter of 0.625, thirty-two pitch output may be provided.

According to the invention, a stepper motor having a magnetic circuit in which air gaps are minimized is provided without requiring extreme manufacturing precision.

The above description of the best mode of carrying out the invention, in addition to other alternative embodiments, has been provided by way of illustration.

The above description should not be read as limiting the broad scope of the invention which is defined by the following claims.

I claim:

1. A stepper motor comprising:
   a stator gear having a plurality of low reluctance, ferromagnetic, non-permanent magnetic teeth forming sets of pole pieces arrayed in an alternating pattern;
   means for inducing magnetic flux independently in each of said sets of pole pieces;
   a plurality of radially extending insulative spacers disposed between adjacent pole pieces for reducing flux leakage between adjacent pole pieces;
   a rotor including at least one pinion gear having gear teeth which engage the teeth of the stator gear; and
   means for controlling opposed electromagnetic charges supplied to said sets of pole pieces forming teeth of the stator gear, said control means sequentially alternating the polarity of the electromagnetic charge supplied to said sets of pole pieces in a desired direction to cause the rotor to move in said direction and holding the rotor in place by fixing the polarity of electromagnetic charge supplied to said sets of pole pieces.

2. The stepper motor of claim 1 wherein said stator gear is a ring gear formed from a plurality of sets of gear teeth which are interfitted to form said stator gear, said sets of gear teeth being arrayed in the alternating pattern.

3. The stepper motor of claim 2 wherein said means for inducing magnetic flux comprises three torodial coils wherein each of said coils is connected to one of said sets of gear teeth.

4. The stepper motor of claim 1 wherein no air gap is present between adjacent pole pieces of said stator ring gear and said teeth of said rotor pinion gear when said pinion gear engages said adjacent pole pieces.

5. The stepper motor of claim 1 wherein said stator gear is a rack gear and said rotor is a pinion gear.

6. The stepper motor of claim 1 wherein said means for inducing magnetic flux is a plurality of coils connected to one of said teeth of the stator gear, said coils being electrically connected to said means for controlling opposed electromagnetic charges.

7. The stepper motor of claim 1 wherein three pinion gears are supported by a carrier which engage the stator at three spaced points and engage corresponding sets of pole pieces simultaneously.

8. The stepper motor of claim 1 wherein said means for controlling opposed electromagnetic charges comprises a microprocessor programmed to sequentially provide north, south and neutral charges to sets of pole pieces.

* * * * *